(12) United States Patent
Filgate

(10) Patent No.: US 6,292,488 B1
(45) Date of Patent: Sep. 18, 2001

(54) METHOD AND APPARATUS FOR RESOLVING DEADLOCKS IN A DISTRIBUTED COMPUTER SYSTEM

(75) Inventor: Bruce D. Filgate, Boylston, MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/083,683

(22) Filed: May 22, 1998

(51) Int. Cl.[7] ............................. H04L 12/28; H04L 12/56
(52) U.S. Cl. ........................... 370/401; 370/229; 709/235
(58) Field of Search .................................. 370/401, 400, 370/402, 416, 450, 461, 462, 229, 230, 231, 235, 237, 242, 285; 710/200, 244; 709/104, 201, 235, 238

(56) References Cited

U.S. PATENT DOCUMENTS

| | | | | |
|---|---|---|---|---|
| 5,016,167 | * | 5/1991 | Nguyen et al. | 711/151 |
| 5,459,871 | * | 10/1995 | Van Den Berg | 709/104 |
| 5,583,992 | * | 12/1996 | Kudo | 709/201 |
| 5,682,537 | * | 10/1997 | Davies et al. | 710/200 |
| 5,761,454 | * | 6/1998 | Adusumilli et al. | 710/126 |
| 5,835,766 | * | 11/1998 | Iba et al. | 709/104 |
| 5,845,117 | * | 12/1998 | Fujita | 709/107 |
| 6,073,182 | * | 6/2000 | Jones et al. | 709/253 |

* cited by examiner

Primary Examiner—Alpus H. Hsu
Assistant Examiner—Brian Nguyen
(74) Attorney, Agent, or Firm—Kent Lembke; William J. Kubida; Hogan & Hartson LLP

(57) ABSTRACT

A computer system is capable of recovering from a deadlock using communication gateway devices, such as a bridges, which each use a deadlock recovery mechanism. Rather than avoid deadlocks through constant monitoring of the communications path, the bridge allows the deadlock to occur. The recovery mechanisms of the bridges control the resolution of the deadlock. In one embodiment, the recovery mechanism within each bridge causes the local device which controls its bridge to disconnect. Additionally, the bridges terminate their requests for control of each other, thereby breaking the deadlock and allowing communications to resume. In another embodiment, the recovery mechanism within each bridge terminates the bridge's request for control of the other bridge. Additionally, the recovery mechanisms cause the bridges to become idle in accordance with a time delay value. The bridge with the shorter delay becomes active first and takes control of the communication path, thereby breaking the deadlock.

20 Claims, 3 Drawing Sheets

METHOD AND APPARATUS FOR RESOLVING DEADLOCKS IN A DISTRIBUTED COMPUTER SYSTEM

FIELD OF THE INVENTION

The invention relates to the field of computer devices and communications among computer devices within a computer system.

BACKGROUND OF THE INVENTION

Today, there exists a large number of computer devices and systems exchanging data across a variety of communications paths. Computer devices usually communicate by the electronic transfer of data across at least one of a variety of data buses or links. As used herein, the phrase "computer devices" can be any of a wide variety of electronic apparatus, such as personal computers, servers, printers, terminals, processors, storage devices, and many other such entities. A computer system may be comprised of a number of such devices often physically co-located. However, in some cases, computer systems are distributed, wherein not all of the devices are co-located.

Devices which are co-located are said to be "local" to each other, and often communicate over a local data bus, e.g., a SCSI data bus. A local data bus provides a physical and logical communication path among local devices, e.g., devices within the same office building. The local data bus will occasionally use a gateway to control the flow of data on the data bus. Whether two devices are local to each other depends on the distances over which the particular data bus under consideration can adequately transmit data. When a local data bus is insufficient to support communication between devices, the devices are said to be "remote" to each other. Remote devices often communicate over a remote or "long haul" data link. Two examples of commonly used long haul links include a telephone line and a fiber optic line. The term "link" as used herein refers to the communication path between two long haul devices, exclusive of the long haul devices themselves. The long haul devices which drive data across a long haul link may transmit data over large distances, i.e., several miles and beyond. A long haul device typically acts as a gateway between a local data bus and long haul data link, controlling the flow of data from devices connected to the local data bus to the long haul link and vice versa. Commonly used long haul devices include modems and bridges.

Bridges, in conjunction with the data link, transmit and receive data in either a simplex or duplex communication mode, depending on the capabilities of the bridges and link. A simplex communication path allows data transmission in either direction, but in only one direction at a time. Alternatively, a duplex communication path allows data transmission in both directions simultaneously. In the case where the data link is fiber optic, it is typically implemented as a simplex communication path. In many situations, it is not cost effective to install a duplex fiber optic communication path because of the relatively high cost of fiber optic multiplexers which provide a necessary interface to the bridge.

FIG. 1 depicts a typical distributed computer system configuration 100 using a simplex communication path, comprised of bridges 125, 135 as long haul gateway devices and a fiber optic long haul data link 130. A local data bus 115 interconnects multiple local devices, including the bridge 125, and can be referred to as a data bus "segment" with respect to the larger computer system 100. Data link 130 interconnects the bridges 125,135 to accomplish interconnection of the distributed computer devices within system 100. Computer devices 110,140 can be generically referred to as hosts or initiators, when required to transmit data to another device. Computer devices 120, 150 are generally referred to as target devices, because they are the intended recipients of an initiator's transmission. For the purposes of this discussion, the computer devices are considered "peer" devices. Peer devices have equal status regarding data transmission within the system, such that no peer device has inherent ability to assert its communication requests over the communication requests of another peer device.

Communication between devices which are remote to each other is typically straightforward. For example, initiator 110 of FIG. 1 transmits data across the local data bus segment 115 to bridge 125. The bridge transmits the data across data link 130 to bridge 135. Finally, bridge 135 transmits the data across data bus segment 145 to target device 150. In order to accomplish this data transmission, the initiator 110 must first "take control" of the local bridge and then take control of the remote bridge. To take control of a bridge, a device gets the bridge to dedicate itself to the transmission requested by that device. Once control of both bridges is secured, the initiator 110 and target 150 have secured the communication path and may exchange data.

One characteristic of a simplex communication path is that multiple devices may be competing for the path at one time, even though the simplex communication path is only capable of accommodating transmission in one direction at a time. Therefore, contention for the bridges and data link may result. In most cases, this is not a problem as long as, for example, initiator 110 requests bridges 125 and 135 before initiator 140 requests bridge 135. In such a case, initiator 110 gets control of bridges 125 and 135 before initiator 140 gets control of bridge 135. However, if the first bridge is controlled by one device and the second bridge has been taken over by a different device, a "deadlock" occurs. In a deadlock situation, neither device can successfully transmit over the simplex communication path because both bridges are trying to transmit to each other at the same time.

A specific example of how a deadlock can occur in a computer system can be described with reference to FIG. 1. For the purposes of this example, it may be assumed that interlocking mechanisms 126 and 127 (which are discussed later) are not part of system 100. In this example, initiator 110 attempts to write data to target 150 at about the same time initiator 140 attempts to write data to target 120. Initiator 110 transmits a write command to target 150 and, in doing so, initiator 110 "arbitrates" for bus 115 and wins the arbitration, since at the time there is no other contention for bridge 125 or bus 115. The process wherein a device attempts to get control of the communication path, by taking control of the bridge pair and link, is referred to as "arbitration". The long haul data link port of bridge 125 becomes idle, i.e., the bridge "disconnects", as bridge 125 prepares to communicate the write command to target 150, via bridge 135. Herein the term "disconnect" refers to when a bridge or other device ceases the transmission of messages from its ports (at least temporarily), although it may continue to receive messages. When ready, bridge 125 becomes active again and propagates the initiator's 110 write command to bridge 135, which in turn transmits it to target 150. Upon receipt of the write command sent by initiator 110, target 150 disconnects, as it prepares to respond to and get data from initiator 110. During this time, initiator 140 issues a write command to target 120 and then disconnects. Bridge 135 receives the write command propagates it through bridge 125 to target 120. Target 120, upon receipt of the write command, disconnects and prepares to respond to and get data from initiator 140.

At this point, there are two write commands outstanding in the system, one in each direction, and each initiator 110,140 is disconnected from its respective bus 115, 145. Both target 120 and target 150 reconnect and take control of bridge 125 and bridge 135, respectively, in an attempt to get data from initiator 140 and initiator 110, respectively. Each target then attempts to take control of the second bridge needed to establish the full communication path to their respective initiators. However, neither bridge is available to the target remote to it, since the target local to it is already controlling it. Typically, this deadlock situation remains indefinitely until the system is reinitialized.

Many systems are implemented to avoid a deadlock situation. Deadlock avoidance is accomplished typically by using either a fully or partially interlocking system. Interlocking systems rely on synchronization among the various devices in the system, such that a device attempting remote communications is required to determine that both bridges are available before it takes control of either bridge. This process involves a typical "handshaking" scheme, whereby devices seeking to communicate exchange acknowledgment messages signaling their availability. Customarily, interlocking mechanisms 126, 127 are embedded in the bridges, as shown in FIG. 1. If both bridges are not available, an initiating device, e.g., initiator 110, will not make its transmission. Instead, the initiator 110 will stay idle until it can acquire and control both bridges. Interlocking mechanisms are well known in the art of data transmission systems and devices and will not be discussed in detail herein.

While the problem of a deadlock is described herein in terms of a very simple two bridge link, multiple bridge systems are more the norm. In multiple bridge systems, the problems are fundamentally the same as those for two bridge systems, although the likelihood of contention is greater. Implementation of typical interlocking mechanisms requires that all devices seeking to transmit over the link continually monitor the link to ensure that the bridges are available for the desired transmission. The continual monitoring by all devices results in a great expense to the system in terms of taking time away from other processing activities. The expense of deadlock avoidance increases as the length of transmission increases, becoming particularly problematic at distances of five hundred feet and beyond. This proves to be inefficient because, typically, a deadlock will only occur about once in every 10,000 data transmissions. Therefore, the large majority of the time spent monitoring is of no benefit. Given the absence of relative low cost deadlock recovery mechanisms in such computer systems, the expensive use of resources to prevent deadlocking by implementing interlocking schemes has been necessary.

There is a need to allow computer devices to communicate across data links without expending significant resources for providing link monitoring. There is also a need to implement a solution within reasonable cost constraints given the basic communication bridge devices available today, rather than implementing a costly duplex fiber optic solution.

SUMMARY OF THE INVENTION

In accordance with the present invention, a computer system is provided that is capable of recovering from a deadlock occurring between devices communicating across a long haul simplex data link. Rather than prevent the deadlock, the system allows the deadlock to occur and then recovers from it. Because the time spent to recover from a deadlock in accordance with the present invention is equal to about the time it takes to accomplish one data transmission, a significant time savings is achieved by the computer system.

The computer system includes a host device and a target device at each of at least two locations. The host and target devices for a given location are connected by a local data bus segment. Each location also includes a gateway device, e.g., a communication bridge, which connects its local data bus segment to a long haul simplex data link, allowing it to communicate with other locations. A deadlock recovery mechanism is embedded within each bridge to facilitate and control recovery of the system.

In one embodiment, when a deadlock occurs, the deadlock recovery mechanism prompts the device which currently controls it to disconnect from the bridge. When a device disconnects, it relinquishes control of the bridge. Once control of each bridge is relinquished, each bridge no longer forwards its own request for control of the other bridge via the long haul data link. Therefore, each bridge becomes idle, which breaks the deadlock. Each device which originally controlled a bridge attempts to re-take control of the communication path, including both bridges, and to thereby connect to the remote device with which it still seeks to communicate. Various device and system characteristics make it highly improbable that each device will attempt to re-take control at substantially the same time and, therefore, it is also highly improbable that the devices will immediately cause another deadlock.

In another embodiment, the deadlock recovery mechanism within each bridge uses its own unique time delay to control recovery of the system. Once a deadlock occurs, each recovery mechanism prompts its bridge to terminate its request for the other bridge via the simplex long haul data link. A device local to each bridge still has a request pending with its respective bridge to take control of the full communication path, but each recovery mechanism prevents its bridge from servicing its local device's request until the bridge's time delay has expired. The bridge with the shorter time delay, referred to as the "priority bridge", will service its device's request first and, thus, gain control of the other bridge. The time delay may be pre-programmed into the deadlock recovery mechanism or dynamically set by, for example, the use of a random number generator.

BRIEF DESCRIPTION OF THE DRAWINGS

The above and further advantages of the invention may be better understood by referring to the descriptions herein, in conjunction with the accompanying drawings described below.

DESCRIPTION OF THE PREFERRED EMBODIMENTS

Figure 1:
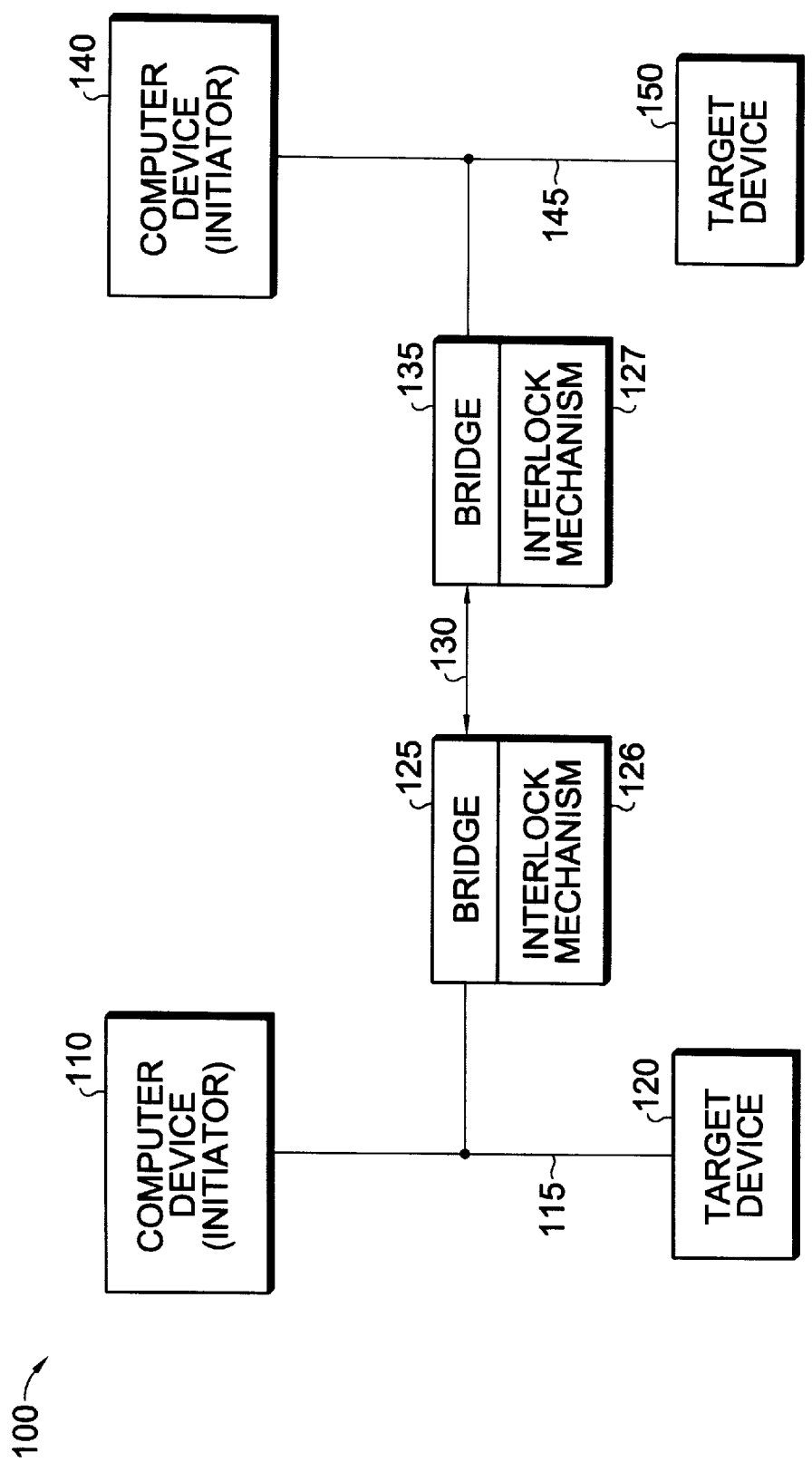
FIG. 1 is a schematic diagram of a prior art computer system.
Figure 2:
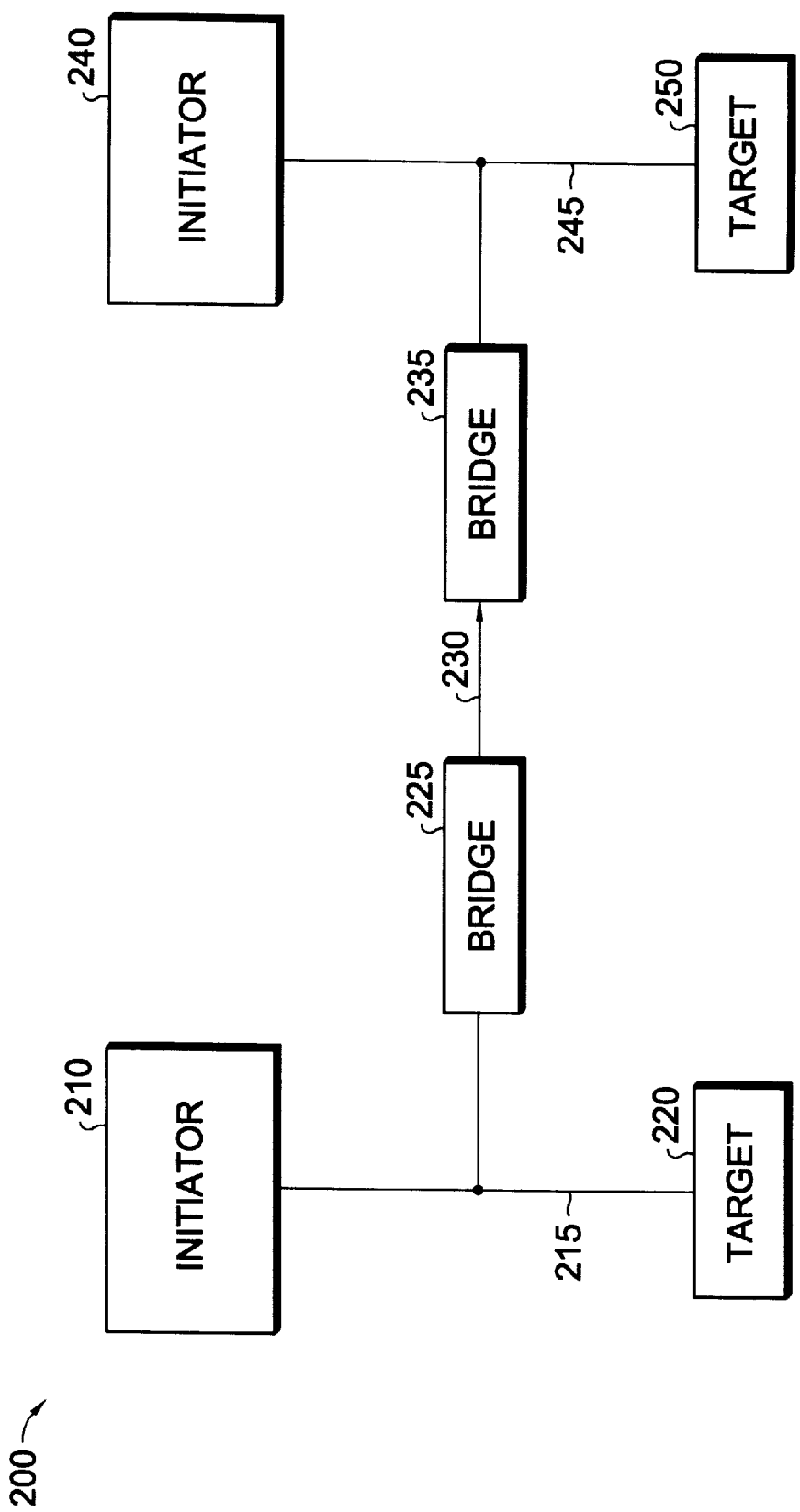
FIG. 2 is a schematic diagram of a computer system employing the bridges of the preferred embodiments.

FIG. 2 depicts a computer system 200 using bridges 225, 235, which include a deadlock recovery mechanism described with reference to FIG. 3. Initiator 210 is connected to target 220 via a local SCSI data bus 215, although any standard local data bus may be used. Initiator 210, SCSI bus 215, and target 220, define a first data bus segment of the computer system 200. Similarly, initiator 240, SCSI bus 245, and target 250 define a second data bus segment of the overall computer system 200.

Connecting the two data bus segments of FIG. 2 is a long haul simplex data link 230 and a pair of bridges 225, 235. Bridge 225 is attached locally to the first data bus segment and bridge 235 is attached locally to the second data bus segment. Each bridge 225, 235 acts as a gateway which controls the flow of data in and out of its respective local data bus segment. The physical composition of long haul data link 230 may take one of a variety of forms, such as fiber optic or copper wire. In the preferred embodiments, the long haul data link 230 is fiber optic, which typically allows a high speed data transfer rate of about one gigabyte per second. This high speed data transfer rate results in shorter delays in the communication between remote devices.

Figure 3:
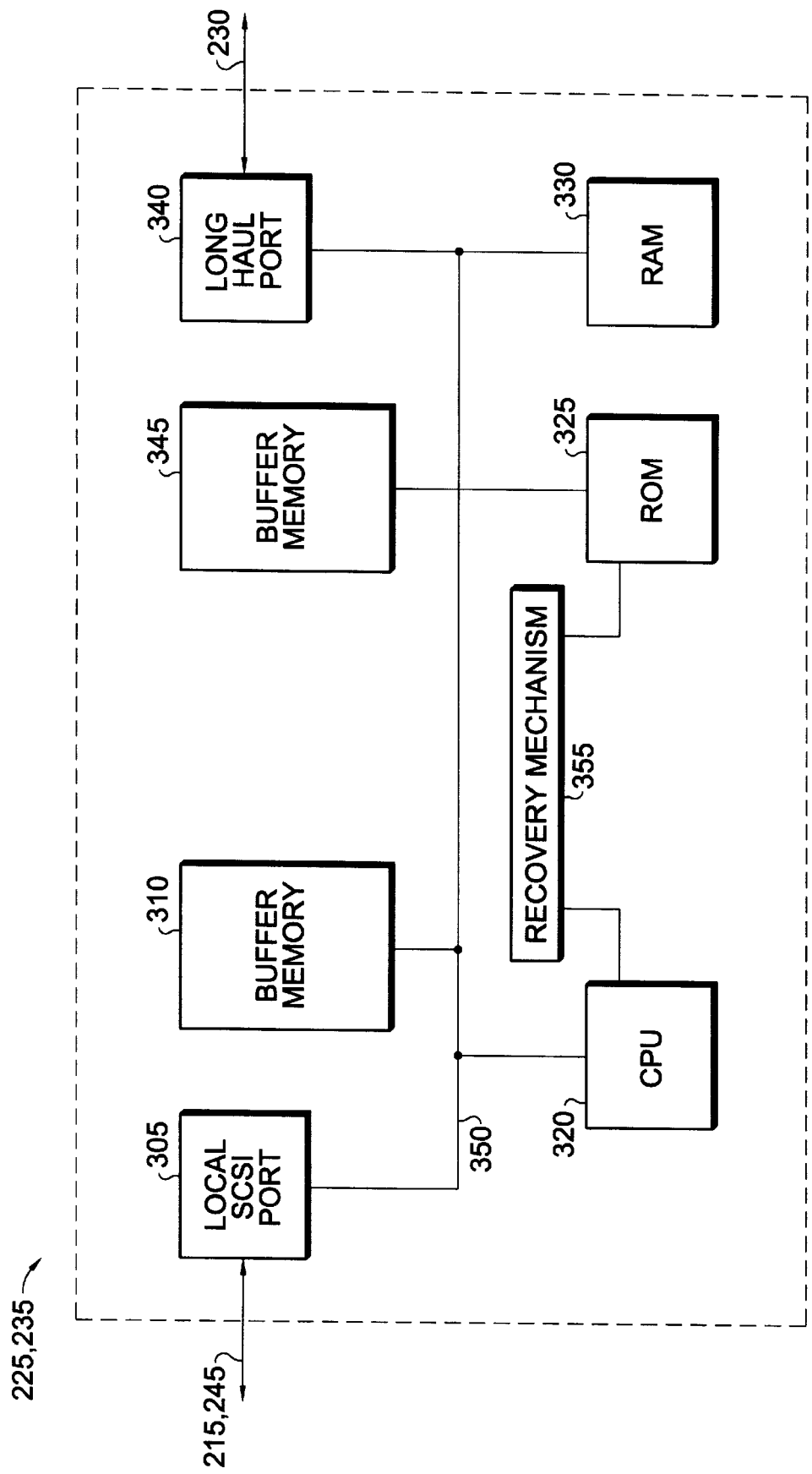
FIG. 3 is a schematic diagram of a bridge in accordance with the preferred embodiments.

The description that follows makes reference to both the system diagram of FIG. 2 and the bridge diagram of FIG. 3. In general, reference numerals beginning with the digit "3" may be found in FIG. 3, while reference numerals beginning with the digit "2" may be found in FIG. 2.

In one embodiment, computer system 200 uses a separate recovery mechanism 355 within each bridge to make each bridge's local and long haul 305, 340 ports available for transmission, thus breaking the deadlock. When in a typical deadlock, initiators 210 and 240 are idle, having already transmitted a request to send data to targets 250 and 220, respectively. Targets 250 and 220, attempting to reply to initiator 210 and 240, respectively, have each taken control of their local bridges 235 and 225 respectively. Therefore, neither bridge 235, 225 can get control of the other bridge 225, 235.

In this embodiment, the CPU 320 of bridge 225 determines that it is in a deadlock situation based on its failure to take control of the other bridge. The bridge CPU 320 prompts the recovery mechanism 355 to act once the deadlock is detected. As a result, the recovery mechanism 355 (discussed in more detail below) of bridge 225 instructs its bridge CPU 320 to generate and transmit a standard SCSI disconnect instruction to target 220 over local SCSI data bus 215, via its SCSI port 305. At substantially the same time, the recovery mechanism 355 of bridge 235 causes its CPU 320 to transmit a standard SCSI disconnect instruction to target 250 over its local SCSI data bus 245. Consequently, each target 220, 250 disconnects and, thereby, relinquishes control of its local bridge 225, 235. When a target disconnects from its bridge, it transmits an indication back to the bridge acknowledging that it is disconnecting, in accordance with standard SCSI device operations. When the recovery mechanism 355 within each bridge detects the target's disconnection indication, it prompts its bridge to disconnect from the remote data link 230, which each bridge does. Each bridge disconnects in accordance with normal disconnect operations of the device, which are carried out by each bridge's CPU 320. Accordingly, each bridge becomes idle, with no requests being received or transmitted at either of its local data bus or long haul data link ports. In accordance with typical target device behavior, each target 220, 250 re-asserts its request for the communication path and attempts to transmit a message to its remote initiator 240, 210.

It is highly improbable that each target 220, 250 in this embodiment will seek to take control of its respective bridge 225, 235 at substantially the same instant in time and, thereby, cause another deadlock. This is because the delay in time associated with a target subsequently requesting to take control of both bridges is a function of various factors. For example, the time it takes for each target to process a disconnect instruction transmitted by its bridge and prepare a new request to take control of its bridge depends, in part, on other processing the target is doing at that time, the speed of the target's processor, and the volume of traffic on the target's local data bus. The fact that a target 220, 250 needs only a small interval of time to take control of bridges 225 and 235, typically on the order of milliseconds, also decreases the probability that both targets 220 and 250 will again immediately contend for the communication path at substantially the same time. Therefore, the deadlock is broken and the first target to request control of the communication path will be successful.

In another embodiment, when the deadlock occurs, the deadlock recovery mechanism 355 does not request that the target device controlling the bridge disconnect, but uses a relative time delay between the two bridges to determine which target will control the communication path.

In response to the deadlock situation, the recovery mechanism 355 within each bridge 225, 235 causes its bridge CPU 320 to terminate its request for the other bridge 235, 225. Consequently, the long haul data link port of each bridge 340 becomes idle. Meanwhile, each bridge 225, 235 still has a request pending by its local target 220, 250 to take control of the other bridge 235, 225. However, each bridge 225, 235 remains idle until a period of time has passed, in accordance with a time delay value of the deadlock recovery mechanism 355 within each bridge. The bridge stays idle because the recovery mechanism 355 instructs the CPU 320 not to process messages while the time delay is in effect.

The time delay value of each bridge may be pre-programmed into the bridge 225, 235 or set dynamically by the recovery mechanism 355. If the time delay values are pre-programmed, they are set so as not to be substantially equal to each other. If the time delay values are set dynamically, they are set so that it is highly improbable that they will be equal. For example, the time delay values may be dynamically set by deriving them from a unique identification number within each bridge 225, 235. The time delay values may also be set using a random number generator within each bridge 225, 235, wherein it is highly unlikely that each random number generator will produce the same number at substantially the same instant in time. Deriving a time delay value from a unique identification number or random number is well known in the art and will not be discussed in detail herein.

The bridge with the shortest time delay value is referred to herein as the priority bridge. In the description below, bridge 235 is denoted as the priority bridge and bridge 225 is the non-priority bridge. Since the priority bridge becomes active first, because it stays idle for a shorter period of time, it attempts to service the request of target 250 before the non-priority bridge 225 attempts to service the request of target 220. Priority bridge 235 generates and transmits, over the long haul data link 230, a new request to take control of bridge 225. In response to the request by priority bridge 235, bridge 225 generates and transmits a standard SCSI disconnect instruction to target 220, via its local SCSI data bus 215. Target 220 complies by terminating its request for control of bridge 225. With its local SCSI port now available, bridge 225, in response to the request from bridge 235, selects initiator 210. Selecting initiator 210 means that bridge 225 secures the data path to initiator 210 for target's 250 communication, by directing bridge 225 communications to the SCSI address of initiator 210. As a result, the deadlock is broken and communications between target 250 and initiator 210 takes place.

The architecture of the preferred embodiments of bridge 225, 235 is described in detail with respect to FIG. 3. As is shown, the bridge includes a parallel SCSI port 305, which provides a physical and logical interface to the local data bus segment 215, 245. Data received by the bridge 225, 235 at the SCSI port 305 is initially passed to, and stored in, buffer memory 310, via the bridge's internal bus 350. Buffer memory 310 provides short-term storage for communications data received by the SCSI port 305. Also shown is a bridge CPU 320, which handles a variety of tasks, including generating and transmitting standard SCSI messages and determining whether the bridge is involved in a deadlock. The bridges determine they are in deadlock once they exchange requests to take control of each other, and, subsequently, exchange responses indicating that they cannot accommodate each others' request. Software instructions for the bridge CPU 320 are, for the most part, stored in read only memory (ROM) 325. Random access memory (RAM) 330 is also included, and provides memory for storage of other short-term data and information.

In addition to the SCSI port, there is a fiber optic port 340 within the bridge. Fiber optic port 340 provides a physical and logical interface from the bridge 225, 235 to a remote fiber optic data link 230. Buffer memory 345 stores information the bridge receives at its fiber optic port 340 and may also store information before it is transmitted out through the fiber optic port 340. In general, the movement of data in and out of buffers 310, 345 is controlled by CPU 320.

Recovery mechanism 355 is a software module comprising instructions which are executed by bridge CPU 320 to facilitate and control the system's recovery from a deadlock. The recovery mechanism 355 may be coded in any of a variety of software languages, such an assembly level language, or a higher order language like C++. Given the description herein, the specific software instructions necessary to provide the desired actions of the recovery mechanism 355 may take a number of different forms, and are well within the ability of those reasonable skilled in the art. Alternatively, other embodiments may implement the recovery mechanism 355 in any combination of hardware and software. Regardless of the specific configuration, the bridge implementing the recovery mechanism 355 is an asynchronous device, which allows the bridge to operate without relying on synchronization with other system devices, such as other bridges, initiators, or targets. Synchronization, used in interlocking systems, requires repeated communication between devices and thereby depletes the available processing capacity of the synchronized devices. Alternatively, the asynchronous nature of bridge 225, 235 leaves more of the processor's capacity available for other activities.

In the preferred embodiments, the recovery engine 355 makes use of the standard SCSI messages and inherent capabilities of bridge CPU 320. By merely prompting the bridge CPU 320 to perform normal bridge CPU activities, the benefits of the system are achieved with relative simplicity.

While the invention has been shown and described with reference to preferred embodiments thereof, it will be understood by those skilled in the art that various changes in form and detail may be made herein without departing from the spirit and scope of the invention as defined by the appended claims. For example, while a communication bridge used for communicating remotely is depicted in the preferred embodiments, the deadlock recovery mechanism may be implemented in any gateway device which controls communications over either a local or remote simplex link. The invention may also prove useful in systems which are prone to deadlocks, despite using duplex links. Furthermore, the present invention can be implemented in a computer system comprised of a variety of different computer devices. The use of the terms initiator and target herein is meant to be merely representative of such devices. Also, the computer system depicted herein is simplified to include only two bridges for ease of description and understanding of the present invention. However, in practice, most computer systems and networks include more than two bridges and may comprise computer configurations other than the type shown herein. For example, a computer system may be configured as a ring, where a bridge is placed at each of a plurality of nodes within the ring. The preferred embodiments can be expanded to a wide variety of these alternative configurations and systems comprising more than two gateway devices.

What is claimed is:

1. A deadlock non-avoidance and recovery computer system, comprising:
   a first computer device;
   a second computer device capable of data communication with the first computer device;
   a simplex data link;
   a first gateway device which connects the first computer device to the simplex data link and comprising a first deadlock recovery mechanism, wherein the first computer device is one of several local computer devices connected to the first gateway device and the several local computer devices include at least one initiator and one target computer; and
   a second gateway device which connects the second computer device to the simplex data link and the first gateway device, the second gateway device including a second deadlock recovery mechanism, wherein the second computer device is one of several remote computer devices connected to the second gateway device and the several remote computer devices include at least one initiator and one target computer;
   wherein the first and second gateway devices are configured to each identify a deadlock within the computer system based on a failure to gain control over the other one of the first and second gateway devices and in response to deadlock detection, the first and second deadlock recovery mechanisms are adapted to cause the first and second gateway devices, respectively, to disconnect from the simplex data link and further wherein the identified deadlock is caused by the target computer of the first computer device and the target computer of the second computer device concurrently requesting control of both the first and second gateway devices, and wherein, prior to causing the first and second gateway devices to disconnect from the simplex data link, the first deadlock recovery mechanism is adapted to cause the first gateway device to transmit a disconnect instruction to the target of the first computer device and the second deadlock recovery mechanism is adapted to cause the second gateway device to transmit a disconnect instruction to the target of the second computer device.

2. The computer system of claim 1, wherein the simplex data link is a fiber optic data link.

3. The computer system of claim 1, wherein the first computer device is one of several computer devices connected to the simplex data link by the first gateway device.

4. The computer system of claim 3, wherein the computer devices, connected to the simplex data link by the first gateway device, are interconnected.

5. The computer system of claim 4, wherein the computer devices, connected to the simplex data link by the first gateway device, are interconnected via a data bus.

6. The computer system of claim 1, further comprising a third computer device, wherein the third computer device is connected to the first computer device via the first gateway device.

7. The computer system of claim 1, wherein the first and second deadlock recovery mechanisms are configured to, after causing the first and second gateway devices to disconnect from the simplex data link, instruct the first and second gateway devices to not process messages received from the first and second computer devices for a first and a second delay period of time, respectively.

8. The computer system of claim 7, wherein the first and second delay periods are dynamically derived by the first and second deadlock recovery mechanisms prior to the instructing of the first and second gateway devices.

9. In a data communication system having a first gateway device comprising a first deadlock mechanism to which a first data transmission device local to it is connected, and a second gateway device comprising a second deadlock recovery mechanism to which a second data transmission device local to it is connected, the two gateway devices being connected to each other by a simplex data link, a method of resolving a deadlock in which each of the gateway devices is under the control of its local data transmission device, and each has a request pending for control of the other gateway device, the method comprising the steps of:

(A) identifying with the first and second computer devices a deadlock within the data communication system based on failure of the requests for control of the other gateway device, wherein the identified deadlock is caused by substantially concurrent submittal of the requests and wherein the first computer device is one of several local computer devices connected to the first gateway device and the several local computer devices include at least one initiator and one target computer and the second computer device is one of several remote computer devices connected to the second gateway device and the several remote computer devices include at least one initiator and one target computer;

(B) causing with the first deadlock recovery mechanism the first gateway device to transmit a disconnect instruction to the target of the first computer device;

(C) substantially concurrently with step (B), causing with the second deadlock recovery mechanism the second gateway device to transmit a disconnect instruction to the target of the second computer device;

(D) with the first deadlock recovery mechanism, causing the first gateway device to disconnect from the simplex data link;

(E) with the second deadlock recovery mechanism, causing the second gateway device to disconnect from the simplex data link.

10. The method of claim 9, wherein the completion of steps (B) and (C) results in transitioning the remote port of the first gateway device to an idle state and transitioning the remote port of the second gateway device to an idle state.

11. The method of claim 9, further comprising the steps of:

(F) determining a first time delay value for the first gateway device; and (G) maintaining the remote port of the first gateway device in an idle state for a first period of time derived from the first time delay value.

12. The method of claim 11, further comprising the steps of:

(H) determining a second time delay value for the second gateway device; and (I) maintaining the remote port of the second gateway device in an idle state for a second period of time derived from the second time delay value.

13. The method of claim 12, further comprising the steps of:

(J) determining a priority data transmission device, from among the first and second data transmission devices, the priority data transmission device being the device whose time period expires first;

(K) defining a priority gateway device as being the gateway device local to the priority data transmission device, from among the first and second gateway devices, and defining the remaining gateway device as a non-priority gateway device;

(L) transmitting a request by the priority data transmission device, pending at the local port of the priority gateway device to the remote port of the priority gateway device for control of the non-priority gateway device, and then transmitting the request to the non-priority gateway device.

14. The method of claim 12, wherein step (H) comprises reading from memory within the second gateway device, a second time delay value which has been predetermined.

15. The method of claim 12, wherein step (H) comprises deriving the second time delay value from a unique identification number of the second gateway device.

16. The method of claim 12, wherein step (H) comprises deriving the second time delay value from a random number generator.

17. The method of claim 11, wherein step (F) comprises reading from memory within the first gateway device, a first time delay value which has been predetermined.

18. The method of claim 11, wherein step (C) comprises deriving the first time delay value from a unique identification number of the first gateway device.

19. The method of claim 11, wherein step (C) comprises deriving the first time delay value from a random number generator.

20. A computer program product for use with a distributed computer system, the computer system having a first computer device in connection with a first gateway device with a first deadlock mechanism, a second computer device in connection with a second gateway device with a second deadlock recovery mechanism and capable of data communication with the first computer device, and a simplex data link connecting the first and second gateway devices, wherein the first computer device is one of several local computer devices connected to the first gateway device and the several local computer devices include at least one initiator and one target computer and the second computer device is one of several remote computer devices connected to the second gateway device and the several remote computer devices include at least one initiator and one target computer, the computer program product comprising:

a computer usable medium having computer readable program code thereon for resolving a deadlock between the first and second gateway devices, the computer program code comprising:

a program code for identifying that a deadlock has been caused by competing requests of the first and second gateway devices for control of the simplex data link by the first and second computer devices; a program code for operating the first deadlock recovery mechanism to cause the first gateway device to transmit a disconnection instruction to the target of the first computer; a program code for operating the second deadlock recovery mechanism to cause the second gateway device to transmit a disconnection instruction to the target of the second computer device; a program code for operating the first deadlock recovery mechanism to cause the first gateway device to disconnect from the simplex data link; and a program code for operating the second deadlock recovery mechanism to cause the second gateway device to disconnect from the simplex data link.

* * * * *